(12) United States Patent
Tiwari

(10) Patent No.: US 9,549,302 B2
(45) Date of Patent: Jan. 17, 2017

(54) APPARATUSES AND METHODS FOR PACKET DATA PROTOCOL CONTEXT HANDLING FOR EMERGENCY BEARER SERVICES

(71) Applicant: HTC Corporation, Taoyuan, Taoyuan County (TW)

(72) Inventor: Kundan Tiwari, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 14/471,955

(22) Filed: Aug. 28, 2014

(65) Prior Publication Data

US 2014/0369178 A1    Dec. 18, 2014

Related U.S. Application Data

(62) Division of application No. 13/169,794, filed on Jun. 27, 2011, now Pat. No. 8,917,589.

(60) Provisional application No. 61/359,598, filed on Jun. 29, 2010, provisional application No. 61/371,957, filed on Aug. 9, 2010.

(51) Int. Cl.
*H04W 4/22* (2009.01)
*H04W 76/00* (2009.01)
*H04W 76/02* (2009.01)
*H04W 76/04* (2009.01)

(52) U.S. Cl.
CPC ............. *H04W 4/22* (2013.01); *H04W 76/007* (2013.01); *H04W 76/028* (2013.01); *H04W 76/041* (2013.01)

(58) Field of Classification Search
CPC . H04W 76/007; H04W 76/028; H04W 76/041
See application file for complete search history.

(56) References Cited

U.S. PATENT DOCUMENTS 8,416,690 B2 *   4/2013   Zhao et al. .................... 370/234
2005/0185655 A1 *   8/2005   Blanc et al. ............. 370/395.41

(Continued)

OTHER PUBLICATIONS

3GPP, "Technical Specification Group Core Network and Terminals; Mobile radio interface Layer 3 specification; Core network protocols; Stage 3 (Release 9)", 3GPP TS 24.008 V9.3.0 (Jun. 2010), pp. 1-611.

(Continued)

*Primary Examiner* — Asad Nawaz
*Assistant Examiner* — Saad A Waqas
(74) *Attorney, Agent, or Firm* — Birch, Stewart, Kolasch & Birch, LLP

(57) ABSTRACT

A Packet Data Protocol (PDP) context handling method for a Mobile Station (MS) with a PDP context for an emergency bearer service is provided, wherein a radio access bearer (RAB) associated with the PDP context is released by a network. The method comprises the steps of: downgrading the maximum uplink bit rate and the maximum downlink bit rate associated with the PDP context from original non-zero positive values to a zero value; sending a request signal associated with a modification of the maximum uplink bit rate and the maximum downlink bit rate; and re-establishing the RAB for the PDP context with the maximum uplink bit rate and the maximum downlink bit rate reconfigured as the original non-zero values after the request signal has been sent.

2 Claims, 12 Drawing Sheets

(56) References Cited

U.S. PATENT DOCUMENTS

| | | | |
|---|---|---|---|
| 2008/0267143 A1* | 10/2008 | Pasanen et al. | 370/338 |
| 2009/0168696 A1* | 7/2009 | Lindstrom et al. | 370/328 |
| 2010/0128694 A1* | 5/2010 | Choi-Grogan | 370/331 |
| 2011/0189971 A1* | 8/2011 | Faccin et al. | 455/404.1 |
| 2012/0039303 A1* | 2/2012 | Stenfelt et al. | 370/331 |
| 2013/0130688 A1* | 5/2013 | Chin et al. | 455/436 |

OTHER PUBLICATIONS

3GPP, "Technical Specification Group Services and System Aspects; General Packet Radio Service (GPRS); Service description; Stage 2 (Release 10)", 3GPP TS 23.060 V10.0.0 (Jun. 2010), pp. 1-303.

3GPP, "Technical Specification Group Services and System Aspects; General Packet Radio Service (GPRS); Service description; Stage 2 (Release 9)"; 3GPP TS 23.060 V9.5.0 (Jun. 2010), pp. 1-298.

3GPP, "Technical Specification Group Services and System Aspects; Single Radio Voice Call Continuity (SRVCC); Stage 2 (Release 9)"; 3GPP TS 23.216 V9.2.0 (Dec. 2009) pp. 1-41.

NTT Docomo, Inc., "[Draft] LS on RRC Connection Re-establishment", 3GPP TSG-RAN WG2 Meeting #62bis, Tdoc R2-083662, Jul. 4, 2008, pp. 1-2.

* cited by examiner

APPARATUSES AND METHODS FOR PACKET DATA PROTOCOL CONTEXT HANDLING FOR EMERGENCY BEARER SERVICES

CROSS REFERENCE TO RELATED APPLICATIONS

This Application is a Divisional of application Ser. No. 13/169,794, filed on Jun. 27, 2011, which claims priority under 35 U.S.C. §119(e) to U.S. Provisional Application Nos. 61/359,598 and 61/371,957, filed on Jun. 29, 2010 and Aug. 9, 2010, respectively, all of which are hereby expressly incorporated by reference into the present application.

BACKGROUND OF THE INVENTION

Field of the Invention

The invention generally relates to Packet Data Protocol (PDP) context handling, and more particularly, to PDP context handling for an emergency attached Mobile Station (MS).

Description of the Related Art

In current wireless communication technology, an MS may be attached for emergency bearer services to make emergency Packet-Switched calls such as IP Multimedia Subsystem (IMS) calls. An MS is attached for emergency bearer services if it has successfully completed an attachment for emergency bearer services or if it has only a Public Data Network (PDN) connection for emergency bearer services established. When the MS is in a limited service state, it may be only allowed to make emergency calls (e.g. an emergency IMS call). The limited service state is entered when the MS is unable to find a suitable cell to camp on, a Subscriber Identity Module (U)SIM card is not inserted therein, or if the MS receives certain responses to a Location Registration request (e.g., "illegal MS"). In the above cases, the MS attempts to camp on a cell irrespective of the Public land mobile network (PLMN) identity.

According to 3GPP TS 23.216 V9.2.0, a PDP context for an IMS call for an emergency bearer service uses traffic class=conversational and SSD="speech". When the Radio Access Bearer (RAB) of a PDP context for a call with the traffic class=conversational is released by the Radio Access Network (RAN), the maximum uplink bit rate and the maximum downlink bit rate are downgraded to 0 kbit/sec in both the MS and the network. To re-establish an RAB for the active PDP context that is not associated with an RAB, the MS may initiate a re-establishment of RABs by using a Service Request (Service Type=Data) message. For the PDP context with the maximum uplink bit rate and the maximum downlink bit rate of 0 kbit/sec, the network (or the Serving GPRS Support Node, SGSN) shall not establish an RAB. Instead, the MS shall perform a MS-initiated PDP Context Modification to modify the associated bearer resources (i.e. the maximum uplink bit rate and the maximum downlink bit rate) or a Deactivation procedure to deactivate the PDP context.

However, according to 3GPP TS 23.060 V9.5.0, when there is a PDN connection (an active PDP context) for emergency bearer services established, the MS shall not request a modification of the bearer resources (PDP context modification procedure) for the PDN connection. In this case, when the associated RAB of a PDP context for emergency bearer services is released either due to a radio link failure or a termination of the current emergency session, the MS and the network shall change the maximum uplink bit rate and the maximum downlink bit rate to 0 kbit/sec. Thus, the MS is unable to re-establish the IMS call for the emergency bearer service once the associated RAB is released since the MS is not allowed to perform a PDP context modification procedure to modify the associated bearer resources (i.e. the maximum uplink bit rate and the maximum downlink bit rate) for a PDP context for emergency bearer services.

In addition, according to 3GPP TS 24.008 V9.3.0, the MS is not required to retry a PDP context modification procedure or a Service Request procedure to re-establish a RAB for a PDP context with a conversational or streaming class, if:
the PDP Context Modification request invoked by the MS is accepted by the network but the radio access bearer is not established; or
the PDP Context Modification request is rejected with cause "insufficient resources".

This impacts the emergency IMS service as the MS is not allowed to retry the PDP context modification procedure or the Service Request procedure to re-establish the RAB if the first try fails, and a user is unable to immediately get emergency IMS service.

BRIEF SUMMARY OF THE INVENTION

Accordingly, embodiments of the invention provide apparatuses and methods to handle the PDP context for emergency bearer services. In one aspect of the invention, a Packet Data Protocol (PDP) context handling method for a Mobile Station (MS) with a PDP context for an emergency bearer service is provided, wherein a radio access bearer (RAB) associated with the PDP context is released by a network. The method comprises the steps of: downgrading the maximum uplink bit rate and the maximum downlink bit rate associated with the PDP context from original non-zero positive values to a zero value; sending a request signal associated with a modification of the maximum uplink bit rate and the maximum downlink bit rate; and re-establishing the RAB for the PDP context with the maximum uplink bit rate and the maximum downlink bit rate reconfigured as the original non-zero values after the request signal has been sent.

In another aspect of the invention, a Packet Data Protocol (PDP) context handling method for a Mobile Station (MS) with a PDP context for an emergency bearer service is provided, wherein a radio access bearer (RAB) associated with the PDP context is released by a network. The method comprises the step of maintaining the maximum uplink bit rate and the maximum downlink bit rate as original non-zero positive values after the RAB is released.

In another aspect of the invention, an apparatus for a Mobile Station (MS) to handle a Packet Data Protocol (PDP) context for an emergency bearer service is provided, wherein a radio access bearer (RAB) associated with the PDP context is released by a network. The apparatus comprises a processor configured to downgrade the maximum uplink bit rate and the maximum downlink bit rate associated with the PDP context from original non-zero positive values to a zero value, send a request signal associated with a modification of the maximum uplink bit rate and the maximum downlink bit rate, re-establish the RAB for the PDP context with the maximum uplink bit rate and the maximum downlink bit rate reconfigured as the original non-zero values after the request signal has been sent, and perform a data exchange using the re-established RAB associated with the PDP context for the emergency bearer service.

In another aspect of the invention, an apparatus for a Mobile Station (MS) to handle a Packet Data Protocol (PDP) context for an emergency bearer service is provided, wherein a radio access bearer (RAB) associated with the PDP context is released by a network. The apparatus comprises a processor configured to maintain the maximum uplink bit rate and the maximum downlink bit rate as original non-zero positive values after the RAB is released.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

This description is made for the purpose of illustrating the general principles of the invention and should not be taken in a limiting sense. It should be understood that the embodiments may be realized in software, hardware, firmware, or any combination thereof.

Figure 1:
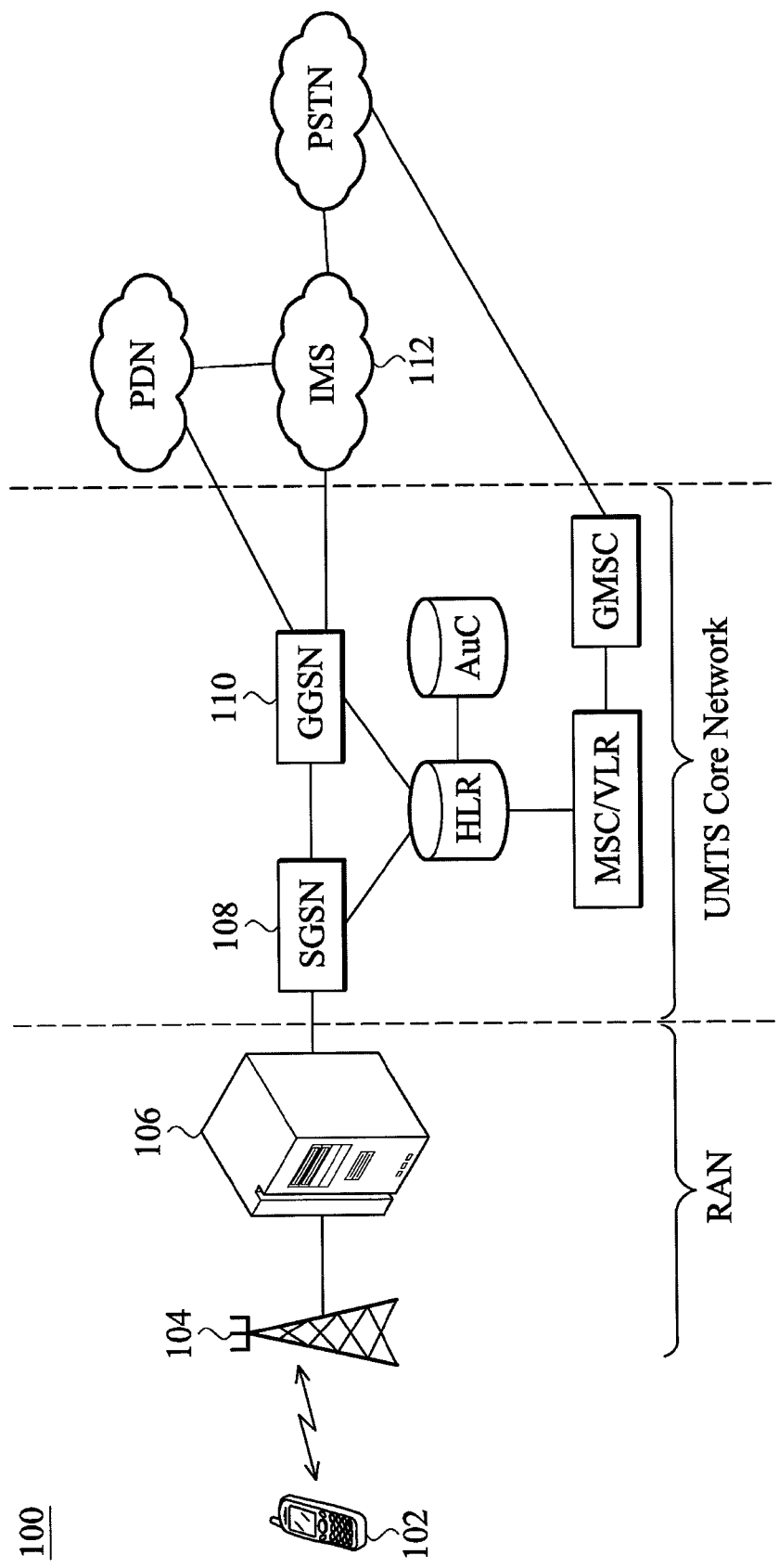
FIG. 1 is an exemplary structure of a Universal Mobile Telecommunications System (UMTS) network 100 according to an embodiment of the invention.

FIG. 1 is an exemplary structure of a Universal Mobile Telecommunications System (UMTS) network 100 according to an embodiment of the invention. In the UMTS network 100, a Radio Access Network (RAN) or a Universal Terrestrial Radio Access Network (UTRAN) includes several Node Bs 104 (only 1 Node B 104 is shown in FIG. 1), which may be accessed by a MS 102 wirelessly to perform data exchange. Each Node B 104 may be connected to a Radio Network Controller (RNC) 106, which controls the connected Node B 104. The RNC 106 is connected to the Serving GPRS Support Node (SGSN) 108 in the UMTS core network. The SGSN 108 performs tasks including packet routing and transfer, mobility management (attach/detach and location management), logical link management, and authentication and charging functions. The Gateway GPRS Support Node (GGSN) 110 connected to the SGSN 108 is responsible for the inter-working between the GPRS network and external packet switched networks, such as the Internet and other X.25 networks. In FIG. 1, the GGSN 110 is connected to an IP Multimedia Subsystem (IMS) 112, which is an architectural framework for delivering Internet Protocol (IP) multimedia services including making Session Initiation Protocol (SIP) calls or IMS calls. The exemplary UMTS 100 only represents a possible network structure for performing IMS calls for emergency bearer services, the MS 102 may also perform IMS calls for emergency bearer services by accessing a network based on Wideband Code Division Multiple Access (W-CDMA) technology, a Code Division Multiple Access 2000 (CDMA 2000) technology, a Worldwide Interoperability for Microwave Access (Wi-MAX) technology, a Long Term Evolution (LTE) technology, a Long Term Evolution-Advanced (LTE-A) technology, and other wireless communication technologies.

Figure 2:
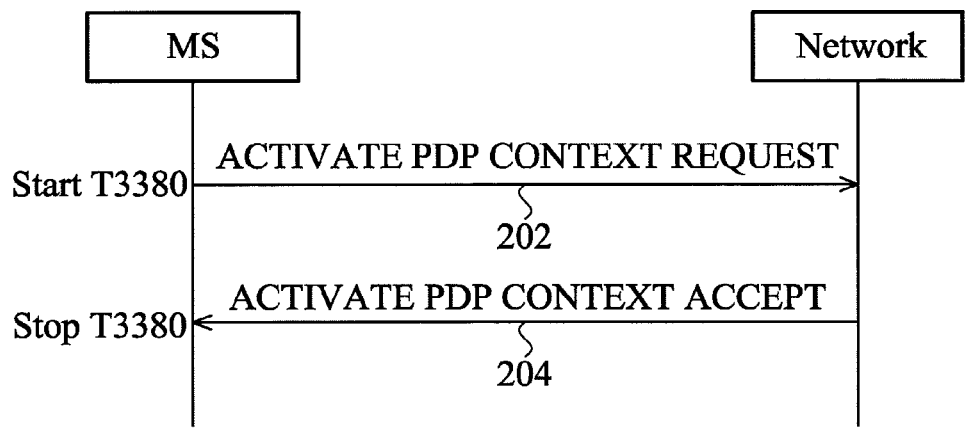
FIG. 2 is a diagram illustrating an MS-initiated PDP context activation procedure for an emergency bearer service.

As described previously, the MS 102 may be allowed to make emergency calls (e.g. an emergency IMS call) when it is in a limited service state. To make an emergency IMS call, the MS 102 may perform a GPRS attach procedure to inform the network about its presence in the network. The MS 102 shall indicate an emergency service during the GPRS attach procedure. In a GPRS attach procedure, the SGSN 108 establishes a mobility management (MM) context relating to the mobility and security for the MS 102. After a successful GPRS Attach procedure for emergency service, the MS 102 shall initiate the activation of an emergency PDP context in order to exchange data packets with the IMS 112. FIG. 2 is a diagram illustrating an MS-initiated PDP context activation procedure for an emergency bearer service. In order to request for a PDP context activation, the MS 102 sends an ACTIVATE PDP CONTEXT REQUEST message 202 to the network, wherein the ACTIVATE PDP CONTEXT REQUEST message 202 contains the requested Quality of Service (QoS) such as the maximum uplink bit rate and the maximum downlink bit rate. Upon receipt of the ACTIVATE PDP CONTEXT REQUEST message 202 with request type set to "emergency", the network shall use the Access Point Name (APN) or the GGSN/Packet Data Network Gateway (PDN GW) configured for emergency bearer services. The network selects a radio priority level based on the QoS negotiated and may reply with an ACTIVATE PDP CONTEXT ACCEPT message 204. Upon reception of the message ACTIVATE PDP CONTEXT ACCEPT 204, the MS 102 enters the PDP-ACTIVE state.

After the PDP context for emergency bearer services is established, the MS 102 may initiate a service request procedure to establish a RAB associated with the active PDP context for emergency bearer services by sending a service request message with Service Type=Data to the network. After the service request procedure initiated by the service request message is successfully performed, the MS 102 may receive a confirmation message from the network. The confirmation message may be a signal indicating that the requested bearer resources has been accepted by the network, and the MS may start sending data packets using the established RAB that is associated with the PDP context for emergency bearer services. For example, the confirmation message may be a service accept message, which contains the new QoS including the maximum uplink bit rate and the maximum downlink bit rate for the active PDP context.

Figure 3:
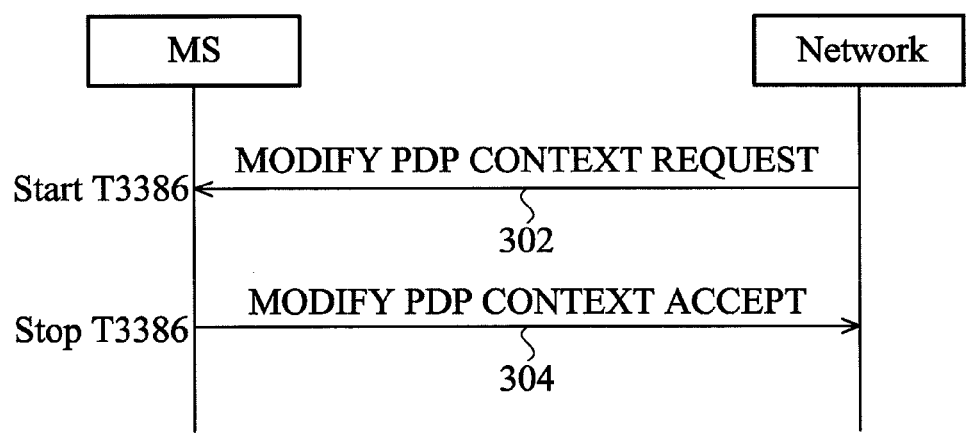
FIG. 3 is a diagram illustrating a network initiated PDP context modification procedure.

A PDP context modification procedure may be invoked by the network or by the MS in order to change the QoS negotiated, including the maximum uplink bit rate and the maximum downlink bit rate, during the PDP context activation procedure. The PDP context modification procedure invoked by the MS may also trigger the re-establishment procedure of the RAB for an activated PDP context which is preserved in the MS with the maximum uplink bit rate and the maximum downlink bit rate of 0 kbit/sec. FIG. 3 is a diagram illustrating a network initiated PDP context modification procedure. In order to initiate the procedure, the network sends a MODIFY PDP CONTEXT REQUEST message 302 to the MS, wherein the MODIFY PDP CONTEXT REQUEST message 302 may contain the new QoS including the maximum uplink bit rate and the maximum downlink bit rate for the PDP context to be modified. Upon receipt of the MODIFY PDP CONTEXT REQUEST message 302, the MS shall reply with the MODIFY PDP CONTEXT ACCEPT message 304 if the MS accepts the new QoS.

Figure 4:
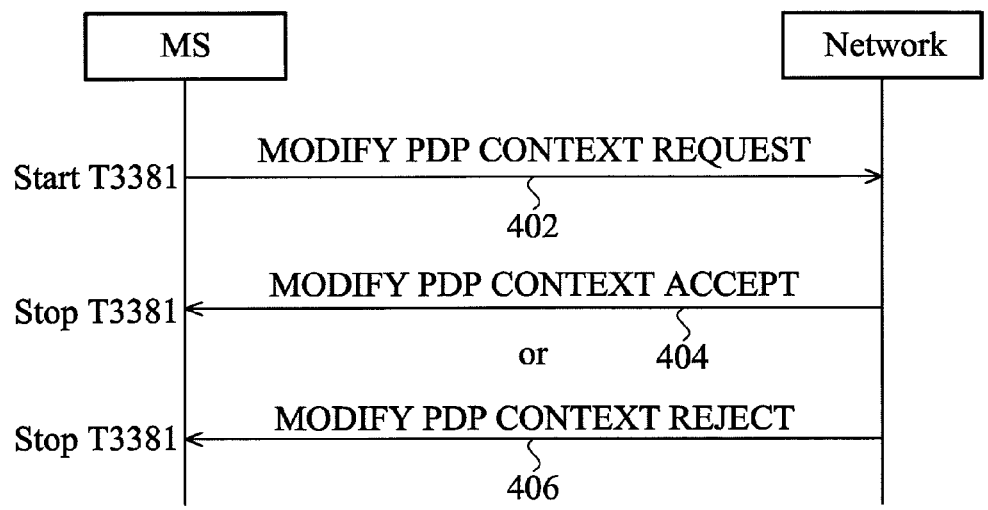
FIG. 4 is a diagram illustrating a PDP context modification procedure initiated by the MS.

FIG. 4 is a diagram illustrating a PDP context modification procedure initiated by the MS. The PDP context modification procedure is invoked by the MS in order to upgrade the maximum uplink bit rate/the maximum downlink bit rate and to trigger the re-establishment of the radio access bearer for an activated PDP context which is preserved in the MS with the maximum uplink bit rate and the maximum downlink bit rate of 0 kbit/s. In order to initiate the MS initiated PDP context modification procedure, the MS sends the MODIFY PDP CONTEXT REQUEST message 402 to the network, wherein the MODIFY PDP CONTEXT REQUEST message 402 may contain the requested new QoS including the maximum uplink bit rate and the maximum downlink bit rate for the PDP context to be modified. Upon receipt of the MODIFY PDP CONTEXT REQUEST message 402, the network may reply with a MODIFY PDP CONTEXT ACCEPT message 404 in order to accept the PDP context modification, wherein the replied MODIFY PDP CONTEXT ACCEPT message 404 may contain the negotiated QoS. Alternatively, the network may reject the MS initiated PDP context modification request by sending a MODIFY PDP CONTEXT REJECT message 406 to the MS. The MODIFY PDP CONTEXT REJECT message 406 may include a cause code, for example, #26 for insufficient resource.

Figure 5:
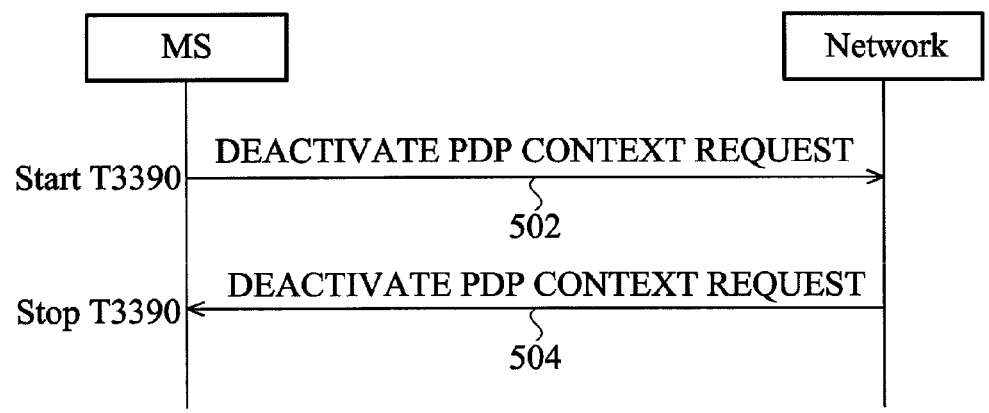
FIG. 5 is a diagram illustrating a PDP context modification procedure initiated by the MS. In order to deactivate a PDP context.

To deactivate an existing PDP context between the MS and the network, a PDP context deactivation procedure may be initiated by the MS or by the network. After a successful PDP context deactivation, the associated Network Service Access Point Identifier (NSAPI) and the Transaction Identifier (TI) values are released and may be reassigned to another PDP context. FIG. 5 is a diagram illustrating a PDP context deactivation procedure initiated by the MS. In order to deactivate a PDP context, the MS sends a DEACTIVATE PDP CONTEXT REQUEST message 502 to the network, wherein the DEACTIVATE PDP CONTEXT REQUEST message 502 may contain the transaction identifier (TI) in use for the PDP context to be deactivated. Upon receipt of the DEACTIVATE PDP CONTEXT REQUEST message 502, the network shall reply with the DEACTIVATE PDP CONTEXT ACCEPT message 504 in order to confirm the PDP context deactivation.

According to 3GPP TS 23.060 V9.5.0, when the RAB of a PDP context for a call with the traffic class=conversational (e.g. an emergency IMS call) is released by the RAN (e.g. the RNC 106), the maximum uplink bit rate and the maximum downlink bit rate are downgraded to 0 kbit/sec in both the MS and the network. For example, the RAN may terminate the downlink data transfer to a MS by a suspend procedure (which is triggered by the MS when the current emergency session has been finished), or a Radio Status procedure with the cause of "Radio contact lost with MS" or "Radio link quality insufficient to continue communication" (which is caused by a radio link failure). When the RAB of the PDP context is released by the RAN, the PDP context is preserved while the maximum uplink bit rate and the maximum downlink bit rate for the PDP context are downgraded from the original positive values to 0 kbit/sec in both the MS and the network. For example, at the network side, the SGSN may send an Update PDP context Request message to the GGSN in order to set the maximum uplink bit rate and the maximum downlink bit rate to 0 kbit/sec in the GGSN. The 0 kbit/sec value indicates to the GGSN to stop sending packets to the SGSN for the PDP context.

Figure 6:
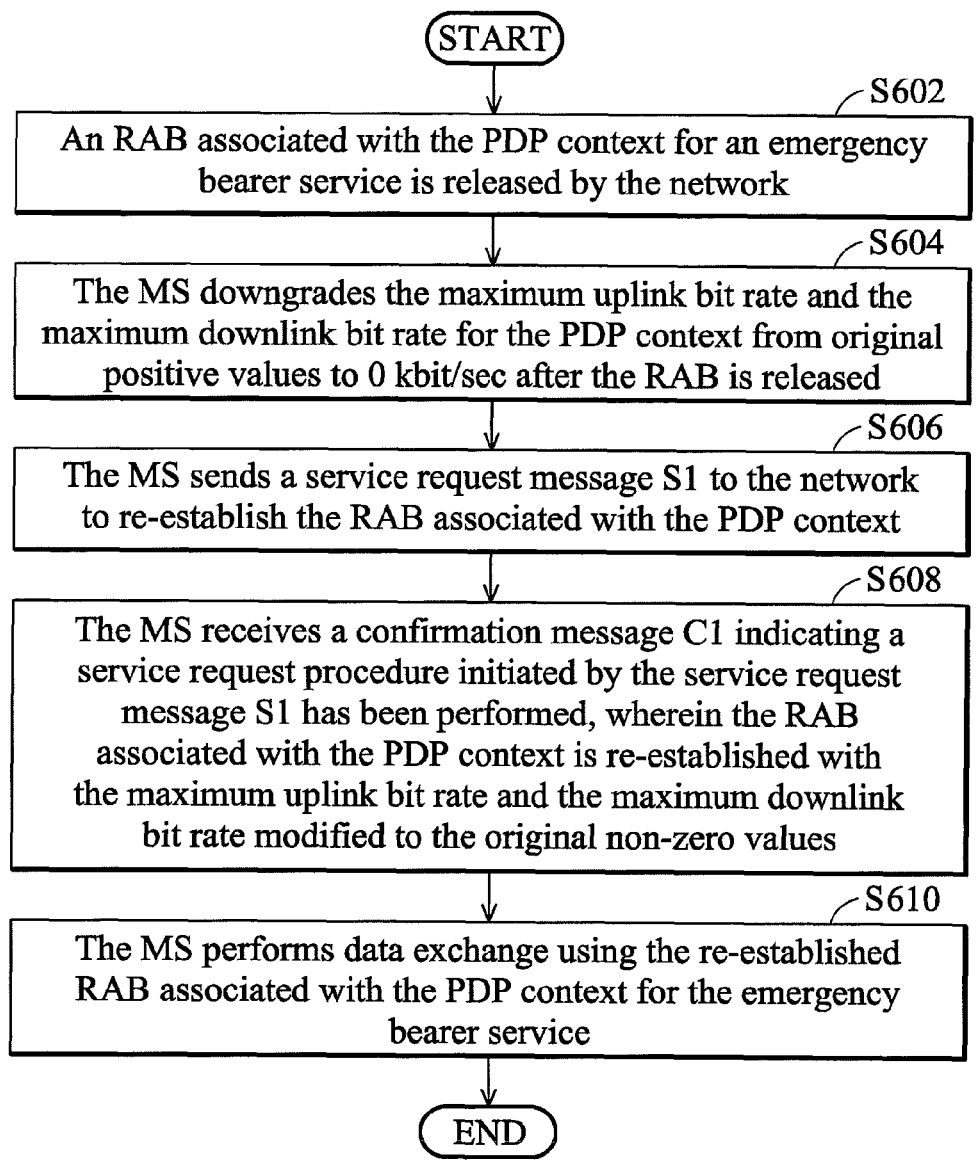
FIG. 6 is a diagram illustrating a flowchart 600 of a PDP context handling method for emergency bearer services according to an embodiment of the invention.

FIG. 6 is a diagram illustrating a flowchart 600 of a PDP context handling method for emergency bearer services according to an embodiment of the invention. First, an RAB associated with the PDP context for an emergency bearer service is released by the network (Step S602). Specifically, the network may terminate the downlink data transfer to a MS by a suspend procedure (which is triggered by the MS when the current emergency session has been finished), or a Radio Status procedure with the cause of "Radio contact lost with MS" or "Radio link quality insufficient to continue communication" (which is caused by a radio link failure). When the RAB of the PDP context is released by the network, the PDP context is preserved. The MS downgrades the maximum uplink bit rate and the maximum downlink bit rate for the PDP context from original positive values to 0 kbit/sec (Step S604). On the network side, the maximum uplink bit rate and the maximum downlink bit rate for the PDP context may also be downgraded from original positive values to 0 kbit/sec. After the maximum uplink bit rate and the maximum downlink bit rate are downgraded to 0 kbit/sec, the MS sends a service request message S1 (Service Type=Data) to the network to re-establish the RAB associated with the PDP context (Step S606). After the service request message S1 is sent, the MS receives a confirmation message C1 (e.g. a service accept message) from the network indicating that a service request procedure initiated by the service request message S1 has been performed, wherein the RAB associated with the PDP context is re-established with the maximum uplink bit rate and the maximum downlink bit rate modified to the original non-zero values by the network in the service request procedure (Step S608). Finally, the MS may perform data exchange using the re-established RAB associated with the PDP context for the emergency bearer service (Step S610).

Figure 7:
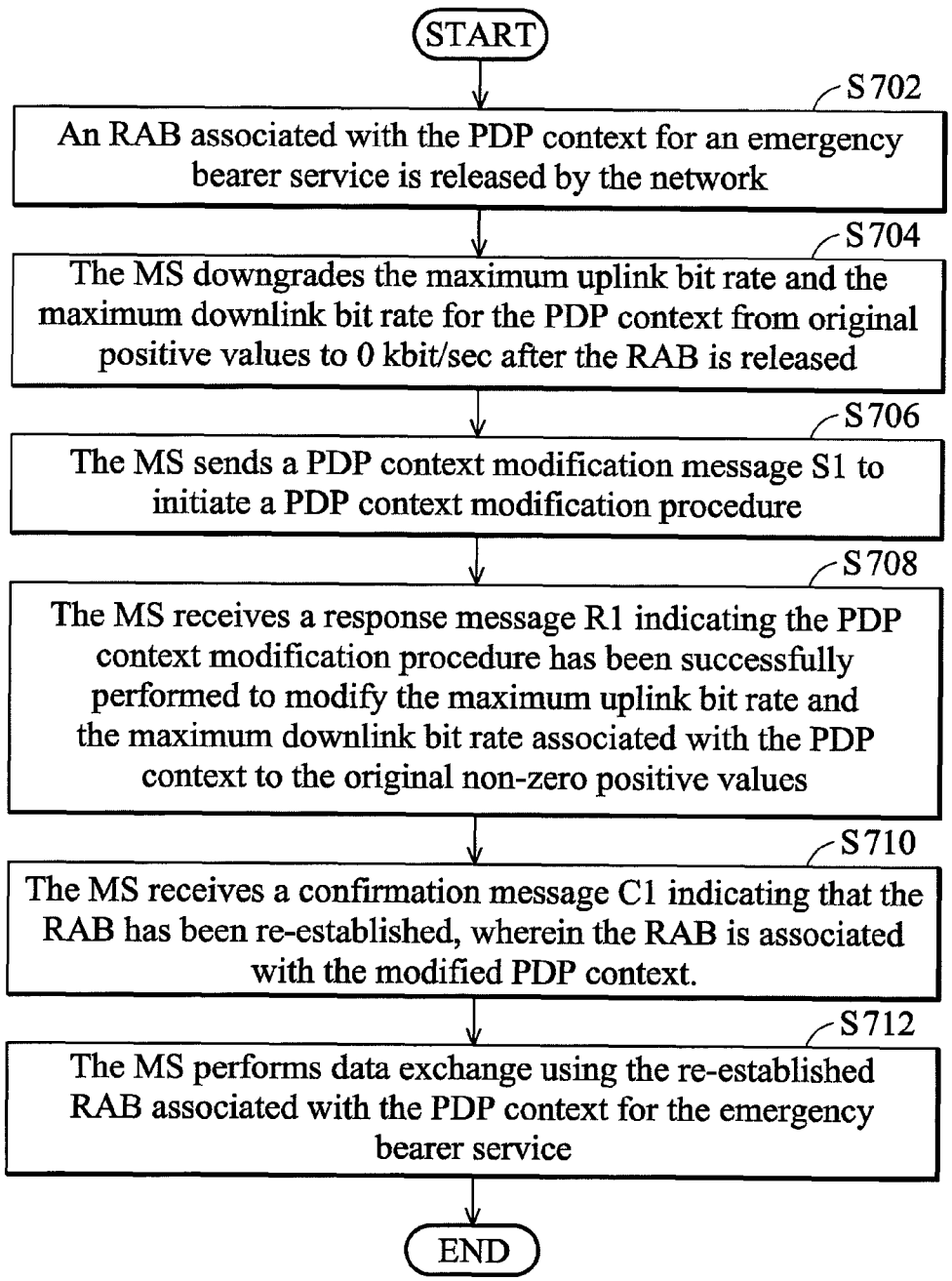
FIG. 7 is a diagram illustrating a flowchart 700 of a PDP context handling method for emergency bearer services according to another embodiment of the invention.

FIG. 7 is a diagram illustrating a flowchart 700 of a PDP context handling method for emergency bearer services according to another embodiment of the invention. Please refer to Step S602 and Step S604 for descriptions related to Step S702 and 704. In Step S706, after the maximum uplink bit rate and the maximum downlink bit rate are downgraded to 0 kbit/sec, the MS sends a PDP context modification message S1 (e.g. the MODIFY PDP CONTEXT REQUEST message 402 in FIG. 4) to the network to initiate a PDP context modification procedure. After the PDP context modification message S1 is sent, the MS receives a response message R1 (e.g. the MODIFY PDP CONTEXT ACCEPT message 404 in FIG. 4) from the network indicating that the PDP context modification procedure has been successfully performed to modify the maximum uplink bit rate and the maximum downlink bit rate associated with the PDP context to the original non-zero positive values (Step S708). After the response message R1 is received, the MS further receives a confirmation message C1 from the network indicating that the RAB associated with the modified PDP context has been re-established, wherein the re-establishment of the RAB is triggered by the PDP context modification procedure (Step S710). Finally, the MS may perform data exchange using the re-established RAB associated with the PDP context for the emergency bearer service (Step S712).

Figure 8:
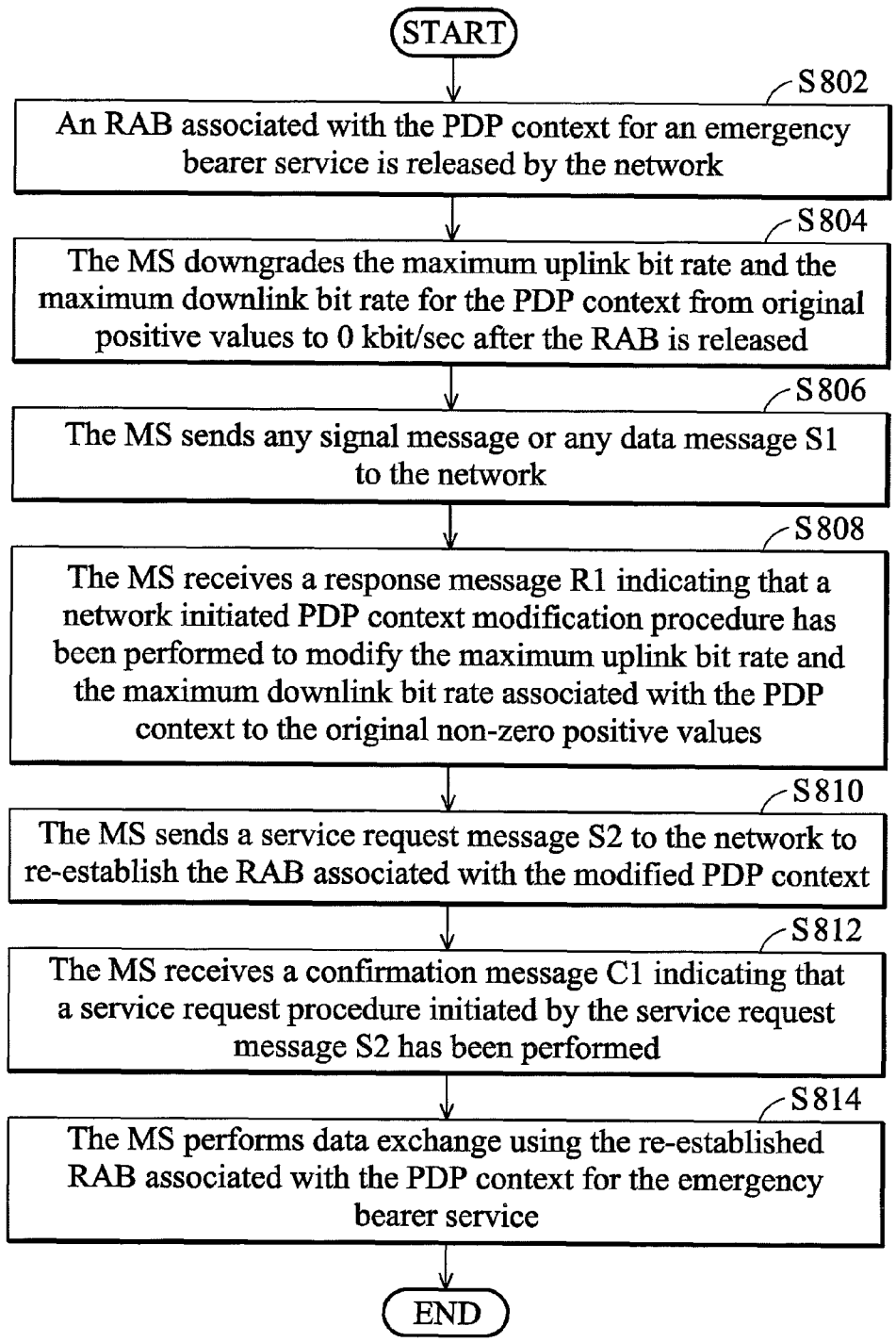
FIG. 8 is a diagram illustrating a flowchart 800 of a PDP context handling method for emergency bearer services according to another embodiment of the invention.

FIG. 8 is a diagram illustrating a flowchart 800 of a PDP context handling method for emergency bearer services according to another embodiment of the invention. Please refer to Step S602 and Step S604 for descriptions related to Step S802 and 804. In Step S806, after the maximum uplink bit rate and the maximum downlink bit rate are downgraded to 0 kbit/sec, the MS sends a signaling message or a data message S1 to the network, wherein the signaling message or data message S1 may be any signaling message or any data message. For example, the signaling message or data message S1 may be a periodic update signal such as a Location Area update signal or a Tracking Area update signal, or any uplink signaling or uplink data sent by the MS. After the signaling message or data message S1 is sent, the MS receives a response message R1 (e.g. the MODIFY PDP CONTEXT REQUEST message 302 as shown in FIG. 3) from the network indicating that a network initiated PDP context modification procedure has been performed to modify the maximum uplink bit rate and the maximum downlink bit rate associated with the PDP context to the original non-zero positive values (Step S808). The MS may confirm the response message R1 by sending an acknowledgement (e.g. the MODIFY PDP CONTEXT ACCEPT message 304) to the network. After the PDP context is modified, the MS may send a service request message S2 (Service Type=Data) to the network to re-establish the RAB associated with the modified PDP context (Step S810). After the service request message S2 is sent, the MS receives a confirmation message C1 (e.g. a service accept message) from the network indicating that the service request procedure initiated by the service request message S2 has been performed (Step S812). Finally, the MS may perform data exchange using the re-established RAB associated with the PDP context for the emergency bearer service (Step S814).

Figure 9:
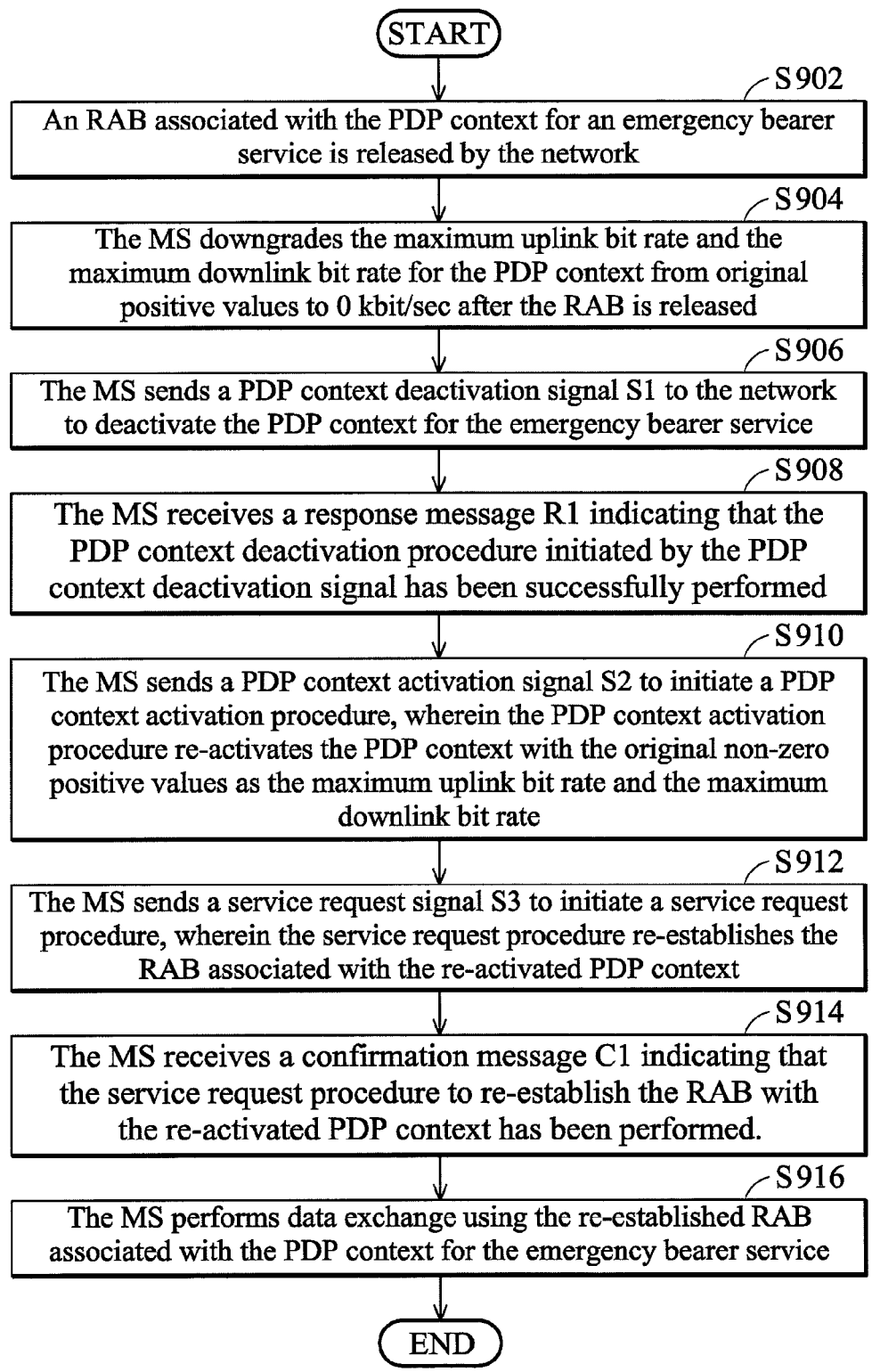
FIG. 9 is a diagram illustrating a flowchart 900 of a PDP context handling method for emergency bearer services according to another embodiment of the invention.

FIG. 9 is a diagram illustrating a flowchart 900 of a PDP context handling method for emergency bearer services according to another embodiment of the invention. Please refer to Step S602 and Step S604 for descriptions related to Step S902 and 904. In Step S906, after the maximum uplink bit rate and the maximum downlink bit rate are downgraded to 0 kbit/sec, the MS sends a PDP context deactivation signal S1 (e.g. the DEACTIVATE PDP CONTEXT REQUEST message 502 in FIG. 5) to the network to deactivate the PDP context for the emergency bearer service. After the PDP context deactivation signal S1 is sent, the MS receives a response message R1 (e.g. the DEACTIVATE PDP CONTEXT ACCEPT message 504 as shown in FIG. 5) from the network indicating that the PDP context deactivation procedure initiated by the PDP context deactivation signal has been successfully performed (Step S908). After the response message R1 is received, the MS sends a PDP context activation signal S2 (e.g. the ACTIVATE PDP CONTEXT REQUEST message 202) to the network to initiate a PDP context activation procedure, wherein the PDP context activation procedure re-activates the PDP context for the emergency bearer services with the original non-zero positive values as the maximum uplink bit rate and the maximum downlink bit rate (Step S910). The MS may receive an acknowledgement (e.g. the ACTIVATE PDP CONTEXT ACCEPT message 204.) from the network upon completion of the PDP context activation procedure. After the PDP context activation procedure has been successfully performed, the MS may send a service request signal S3 to initiate a service request procedure (Service Type=Data), wherein the service request procedure re-establishes the RAB associated with the re-activated PDP context (Step S912). After the service request signal S3 is sent, the MS receives a confirmation message C1 (e.g. a service accept message) from the network indicating that the service request procedure to re-establish the RAB with the re-activated PDP context has been performed using the original non-zero values as the maximum uplink bit rate and the maximum downlink bit rate (Step S914). Finally, the MS may perform data exchange using the re-established RAB associated with the re-activated PDP context for the emergency bearer service (Step S916).

Figure 10:
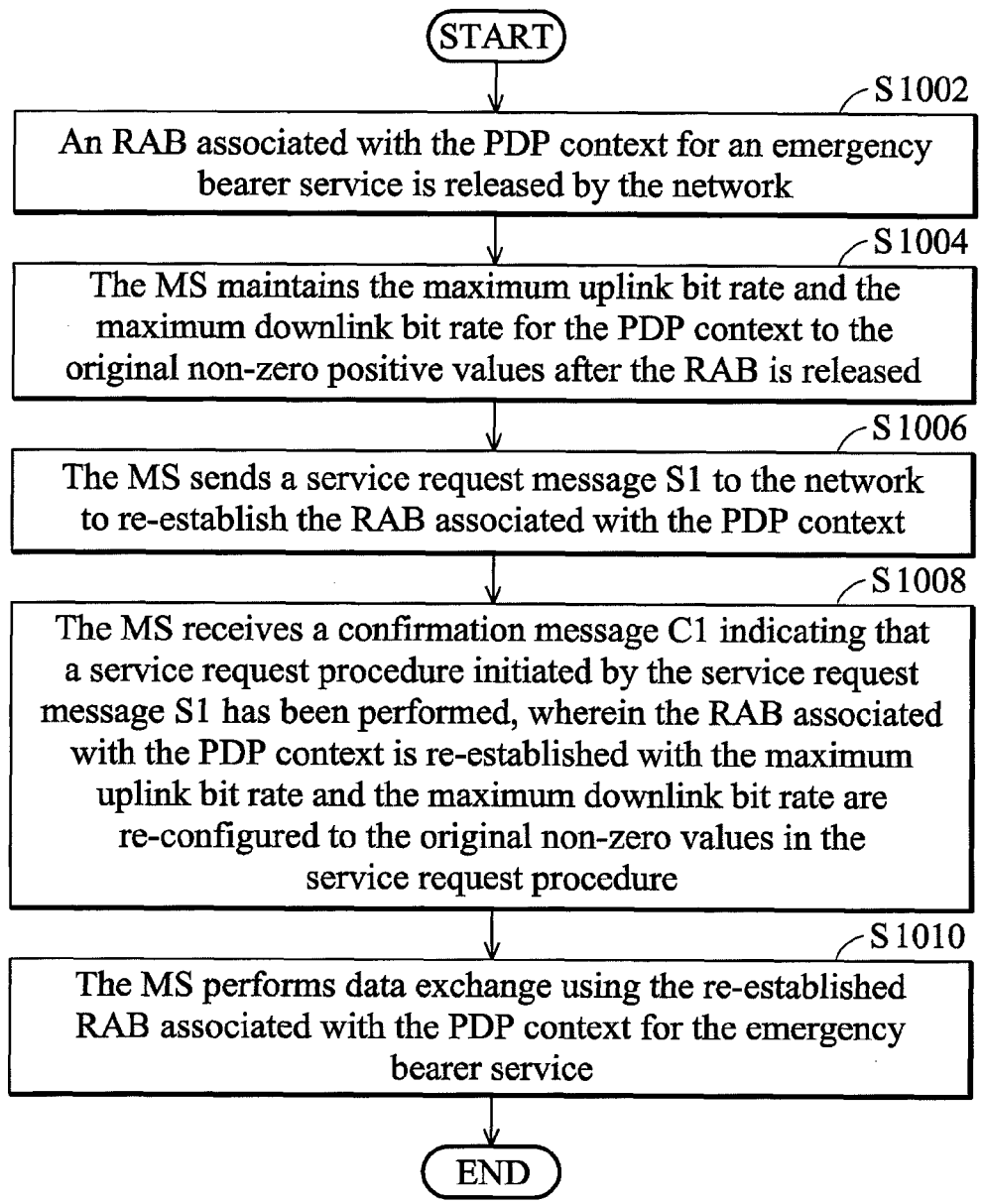
FIG. 10 is a diagram illustrating a flowchart 1000 of a PDP context handling method for emergency bearer services according to another embodiment of the invention.

FIG. 10 is a diagram illustrating a flowchart 1000 of a PDP context handling method for emergency bearer services according to another embodiment of the invention. Please refer to Step S602 for descriptions related to Step S1002. In Step S1004, the MS maintains the maximum uplink bit rate and the maximum downlink bit rate for the PDP context as the original non-zero positive values. On the network side, the maximum uplink bit rate and the maximum downlink bit rate for the PDP context may or may not be downgraded from the original positive values to 0 kbit/sec. Then, the MS sends a service request message S1 (Service Type=Data) to the network to re-establish the RAB for the PDP context (Step S1006). After the service request message S1 is sent, the MS receives a confirmation message C1 from the network indicating that a service request procedure initiated by the service request message S1 has been performed, wherein the RAB associated with the PDP context is re-established with the maximum uplink bit rate and the maximum downlink bit rate to the original non-zero positive values since the maximum uplink bit rate and the maximum downlink bit rate for the PDP context is maintained by the MS (Step S1008). Finally, the MS may perform data exchange using the re-established RAB associated with the PDP context for the emergency bearer service (Step S1010).

Figure 11:
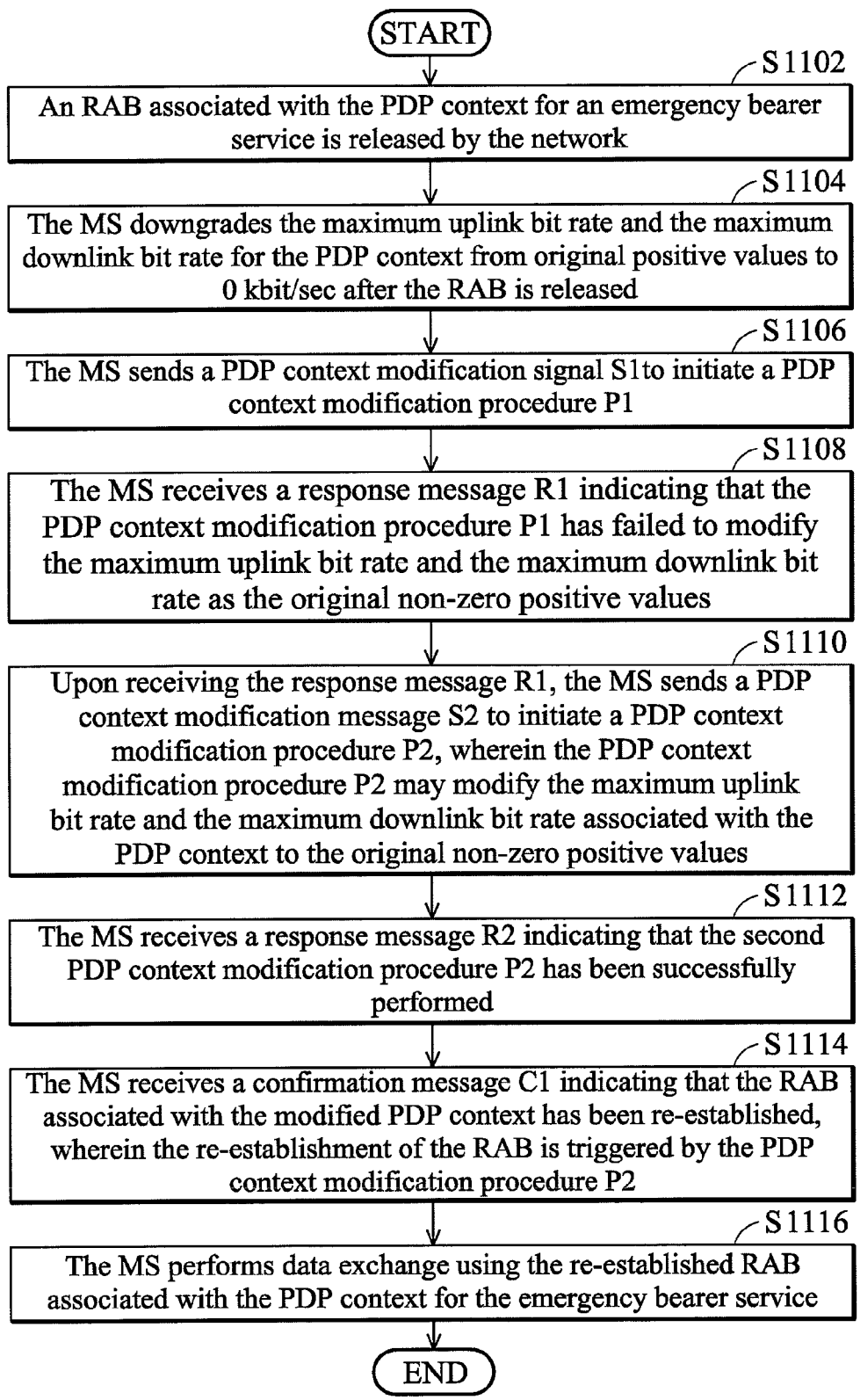
FIG. 11 is a diagram illustrating a flowchart 1100 of a PDP context handling method for emergency bearer services according to another embodiment of the invention.

FIG. 11 is a diagram illustrating a flowchart 1100 of a PDP context handling method for emergency bearer services according to another embodiment of the invention. Please refer to Step S602 and Step S604 for descriptions related to Step S1102 and 1104. In Step S1106, after the maximum uplink bit rate and the maximum downlink bit rate are downgraded to 0 kbit/sec, the MS sends a PDP context modification message S1 (e.g. the MODIFY PDP CONTEXT REQUEST message 402 in FIG. 4) to the network to initiate a PDP context modification procedure. After the PDP context modification message S1 is sent, the MS receives a response message R1 from the network indicating that the PDP context modification procedure P1 has failed to modify the maximum uplink bit rate and the maximum downlink bit rate as the original non-zero positive values (Step S1108). Specifically, the response message R1 may be a MODIFY PDP CONTEXT REJECT message 406 with the cause code #26 to indicate insufficient resources, or the response message R1 may be a message indicating that the PDP context modification invoked by the MS has been accepted by the network but the radio access bearer has not been established. Upon receiving the response message R1 in Step S1108, the MS sends a PDP context modification message S2 (e.g. the MODIFY PDP CONTEXT REQUEST message 402) to the network to initiate a PDP context modification procedure P2, wherein the PDP context modification procedure P2 may modify the maximum uplink bit rate and the maximum downlink bit rate associated with the PDP context to the original non-zero positive values (Step S1110). After the PDP context modification message S2 is sent, the MS receives a response message R2 (e.g. the MODIFY PDP CONTEXT ACCEPT message 404) indicating that the second PDP context modification procedure P2 has been successfully performed (Step S1112). After the response message R2 is received, the MS further receives a confirmation message C1 from the network indicating that the RAB associated with the modified PDP context has been re-established, wherein the re-establishment of the RAB is triggered by the PDP context modification procedure P2 (Step S1114). Finally, the MS may perform data exchange using the re-established RAB associated with the PDP context for the emergency bearer service (Step S1116). Please be noted that the MS can alternatively initiate a service request procedure at Step S1110, so as to re-establish the RAB associated with the PDP context for the emergency bearer service. The details of the service request procedure is described above in relation to Steps 606~608 and will not be repeated here.

Figure 12:
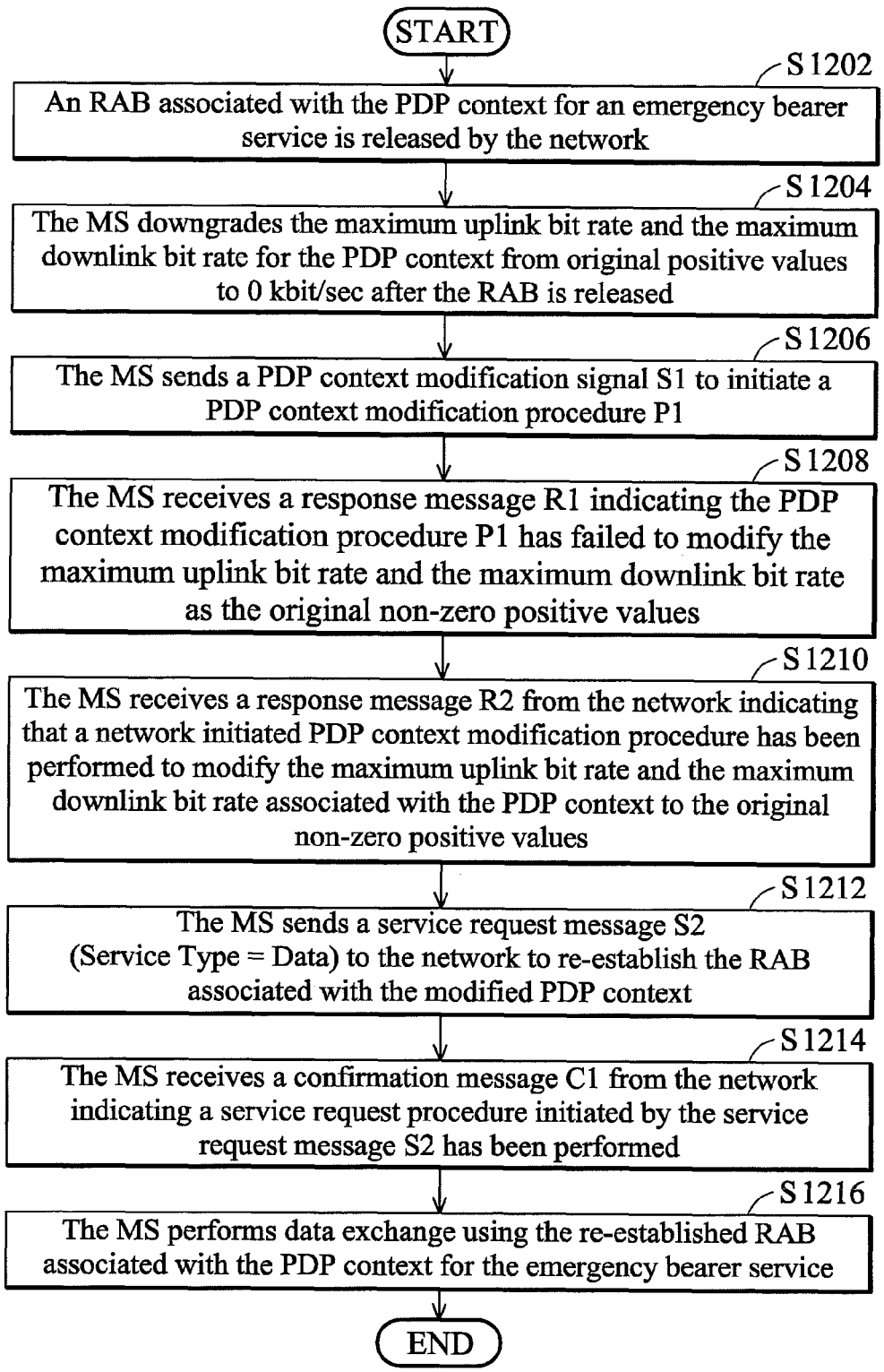
FIG. 12 is a diagram illustrating a flowchart 1200 of a PDP context handling method for emergency bearer services according to another embodiment of the invention.

FIG. 12 is a diagram illustrating a flowchart 1200 of a PDP context handling method for emergency bearer services according to another embodiment of the invention. Please refer to Step S602 and Step S604 for descriptions related to Step S1202 and 1204, and refer to Step S1106 and Step S1108 for descriptions related to Step S1206 and 1208. Upon receiving the response message R1 in Step S1208, the MS further receives a response message R2 (e.g. the MODIFY PDP CONTEXT REQUEST message 302 as shown in FIG. 3) from the network indicating that a network initiated PDP context modification procedure has been performed to modify the maximum uplink bit rate and the maximum downlink bit rate associated with the PDP context to the original non-zero positive values (Step S1210). The MS may confirm the response message R2 by sending an acknowledgement (e.g. the MODIFY PDP CONTEXT ACCEPT message 304) to the network. After the network indicating that a network initiated PDP context modification procedure in Step S1210 has successfully been performed, the MS may send a service request message S2 (Service Type=Data) to the network to re-establish the RAB associated with the modified PDP context (Step S1212). After the service request message S2 is sent, the MS receives a confirmation message C1 from the network indicating that a service request procedure initiated by the service request message S2 has been performed (Step S1214). Finally, the MS may perform data exchange using the re-established RAB associated with the PDP context for the emergency bearer service (Step S1216).

Figure 13:
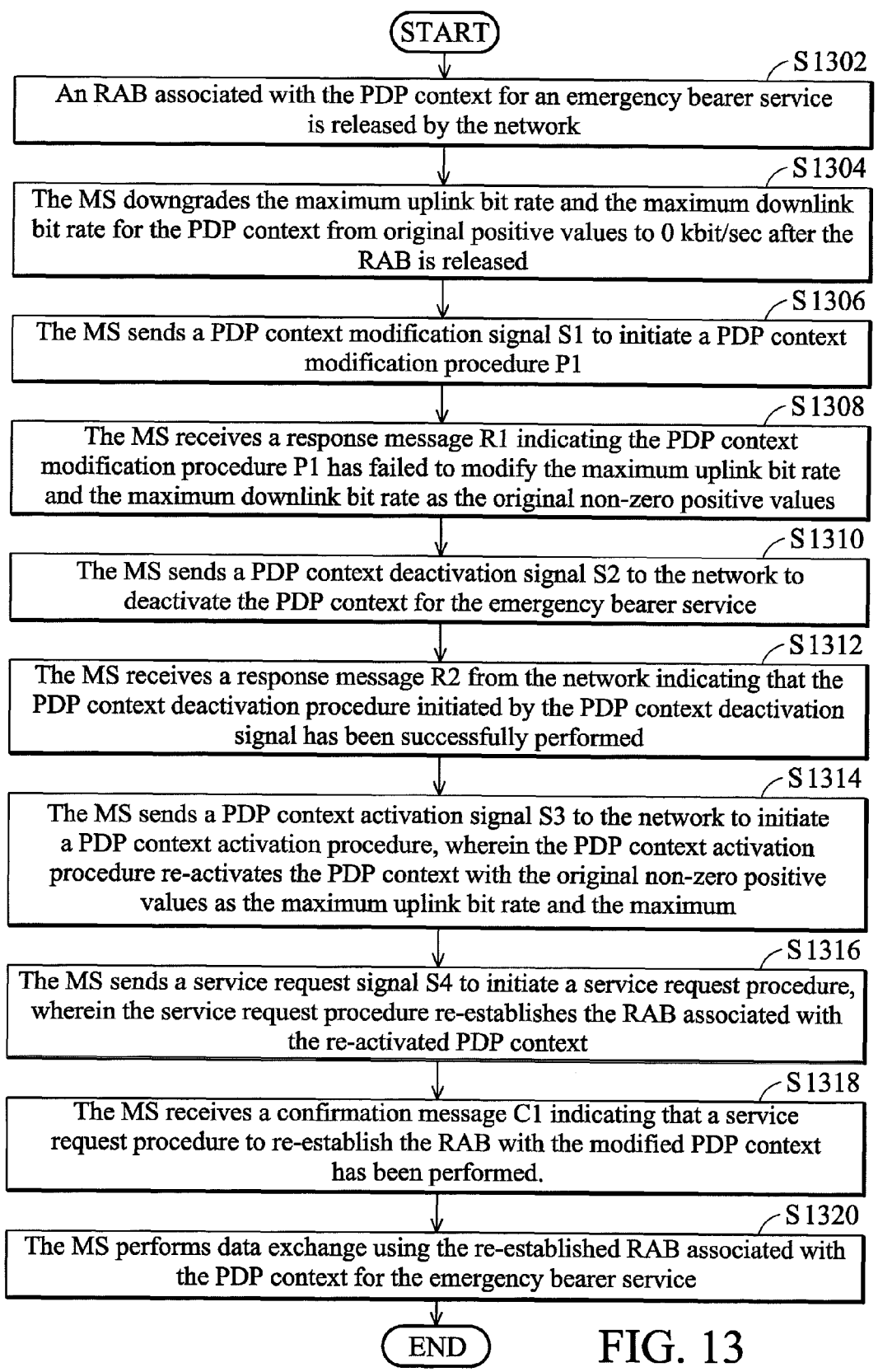
FIG. 13 is a diagram illustrating a flowchart 1300 of a PDP context handling method for emergency bearer services according to another embodiment of the invention.

FIG. 13 is a diagram illustrating a flowchart 1300 of a PDP context handling method for emergency bearer services according to another embodiment of the invention. Please refer to Step S602 and Step S604 for descriptions related to Step S1302 and 1304, and refer to Step S1106 and Step S1108 for descriptions related to Step S1306 and 1308. Upon receiving the response message R1 in Step S1308, the MS sends a PDP context deactivation signal S2 (e.g. the DEACTIVATE PDP CONTEXT REQUEST message 502 in FIG. 5) to the network to deactivate the PDP context for the emergency bearer service (Step S1310). After the PDP context deactivation signal S2 is sent, the MS receives a response message R2 (e.g. the DEACTIVATE PDP CONTEXT ACCEPT message 504 as shown in FIG. 5) from the network indicating that the PDP context deactivation procedure initiated by the PDP context deactivation signal has been successfully performed (Step S1312). After the response message R2 is received, the MS sends a PDP context activation signal S3 (e.g. the ACTIVATE PDP CONTEXT REQUEST message 202) to the network to initiate a PDP context activation procedure, wherein the PDP context activation procedure re-activates the PDP context for the emergency bearer services with the original non-zero positive values as the maximum uplink bit rate and the maximum downlink bit rate (Step S1314). The MS may receive an acknowledgement (e.g. the ACTIVATE PDP CONTEXT ACCEPT message 204.) from the network upon completion of the PDP context activation procedure. After the PDP context activation procedure has been successfully performed, the MS may send a service request signal S4 to the network to initiate a service request procedure (Service Type=Data), wherein the service request procedure re-establishes the RAB associated with the re-activated PDP context (Step 1316). After the MS sends the service request signal S4, the MS receives a confirmation message C1 (e.g. a service accept message) from the network indicating that the service request procedure to re-establish the RAB with the re-activated PDP context has been performed using the original non-zero values as the maximum uplink bit rate and the maximum downlink bit rate (Step S1318). Finally, the MS may perform data exchange using the re-established RAB associated with the re-activated PDP context for the emergency bearer service (Step S1320).

Figure 14:
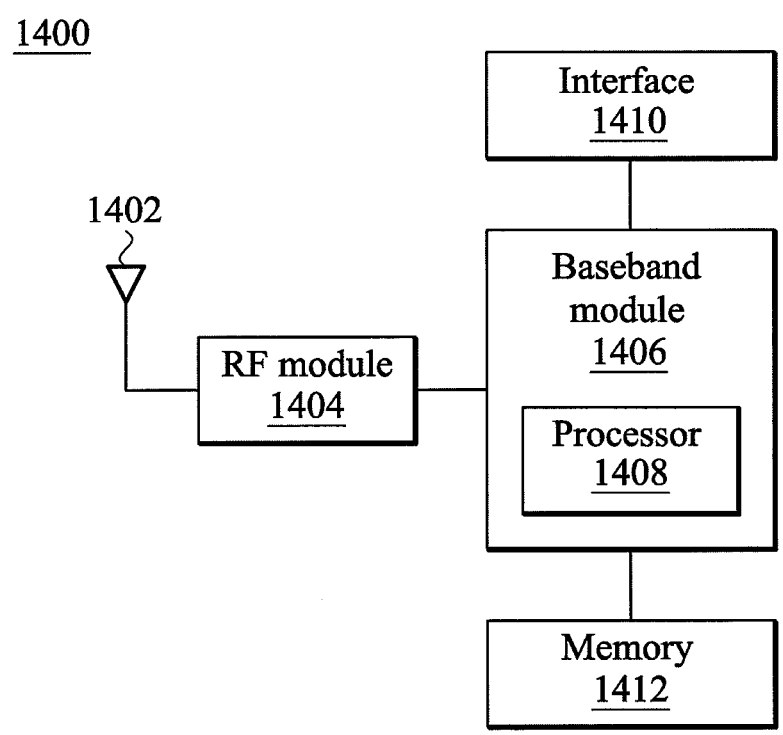
FIG. 14 is a diagram illustrating an exemplary hardware structure that may be employed to realize the methods as described in FIG. 6 to FIG. 13.

FIG. 14 is a diagram illustrating an exemplary hardware structure that may be employed to realize the methods as described in FIG. 6 to FIG. 13. In this regard, FIG. 14 illustrates a user equipment (i.e. UE) 1400 or MS 1400 configured to perform the exemplary embodiments. Please be noted that only elements related to paging channel monitoring are shown here for convenience, with elements not shown, assumed to be known by those skilled in the art. Thus, detailed descriptions are not provided. The UE 1400 may include an antenna 1402, which can transmit and/or receive wireless signals, a radio frequency (RF) module 1404 for radio signal processing, and a baseband module 1406, which is mainly comprised of several integrated circuits (IC) and microcontrollers including a processor 1408. The baseband module 1406 may be connected to an interface 710 (which may include a display, buttons, switches, a speaker, a microphone, and other input/output devices), and a memory 1412 (e.g. RAM memory, flash memory, or removable disk and so on).

The processor 1408 may be embodied in a number of different ways. For example, the processor 1408 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 1408 may be configured to execute instructions stored in the memory 1412 or otherwise be accessible to the processor 1408 to realize the methods as illustrated in FIG.

6 to FIG. 13. The memory 1412 could also be configured with a buffer space to store the messages received from the network. The memory 1412 may be an integrated part of the UE 1400 or may be a removable memory device.

By executing the stored instructions or operating in accordance with hard coded instructions, the processor 1408 may control the operation of the UE 1400 by directing functionalities of the UE 1400 associated with the PDP context handling for emergency bearer services as described above according to the respective configurations provided to the UE 1400 by the processor 1408 and/or the instructions stored in the memory 1412 for configuring the processor 1408. As such, whether configured by hardware or software methods, or by a combination thereof, the processor 1408 may represent an entity capable of performing operations according to exemplary embodiments of invention, while configured accordingly.

In an exemplary embodiment, the processor 1408 and/or the memory 1412 may comprise portions of a processing circuitry configured to cause the UE 1400 to perform functionalities according to the configuration, which is either hardwired into the processor 1408 or provided by the execution of instructions stored in a memory 1412. As such, the UE 1400 may be configured to handle the PDP context for emergency bearer services as described above. As such, the UE 1400 may be configured to perform the method described in connection with FIG. 6 to FIG. 13, with or without modifications.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A Packet Data Protocol (PDP) context handling method for a Mobile Station (MS) with a PDP context for an emergency bearer service in a network, wherein a radio access bearer (RAB) associated with the PDP context is released by a network, the PDP context handling method comprising:
    maintaining, by the MS, a maximum uplink bit rate and a maximum downlink bit rate as non-zero positive values after the RAB is released;
    sending a service request message to the network by the MS for re-establishing the RAB associated with the PDP context; and
    receiving a confirmation message indicating that a service request procedure initiated by the service request message has been performed, wherein the RAB associated with the PDP context is re-established with the maximum uplink bit rate and the maximum downlink bit rate to the non-zero positive values,
    wherein the non-zero positive values are original positive values of the maximum uplink bit rate and the maximum downlink bit rate.

2. The PDP context handling method of claim 1, further comprising:
    performing data exchange using the re-established RAB associated with the PDP context for the emergency bearer service.

* * * * *